Feb. 10, 1931.  O. H. WALLIN  1,792,337
CATALYTIC HEATING DEVICE FOR INTERNAL COMBUSTION ENGINES
Filed Dec. 4, 1928   4 Sheets-Sheet 3

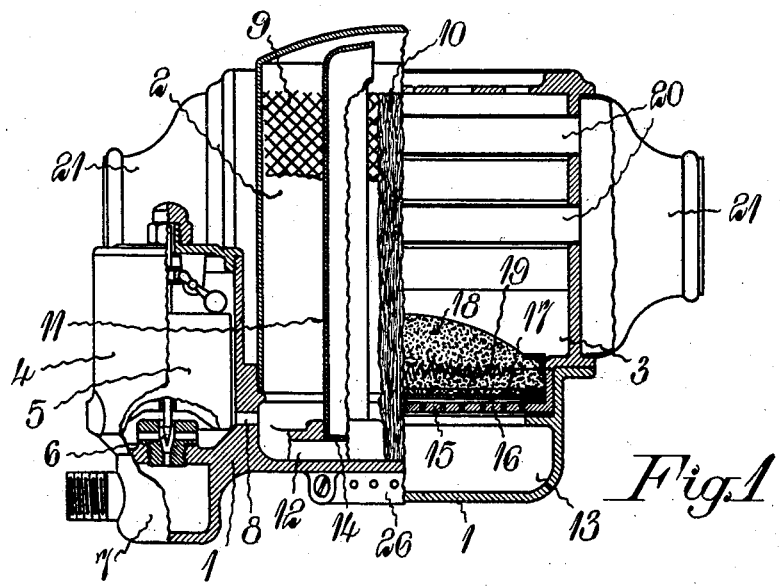

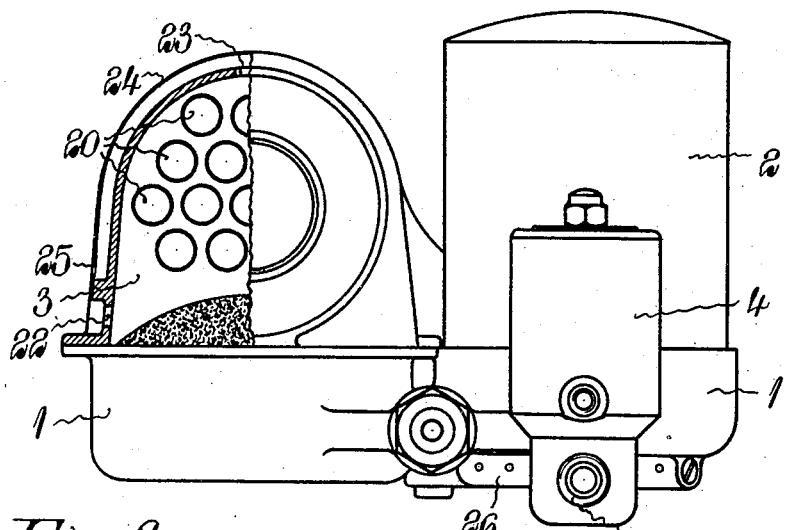

Inventor:
O. H. Wallin.
By Lalipme, Parry, Card + Langner
Attys.

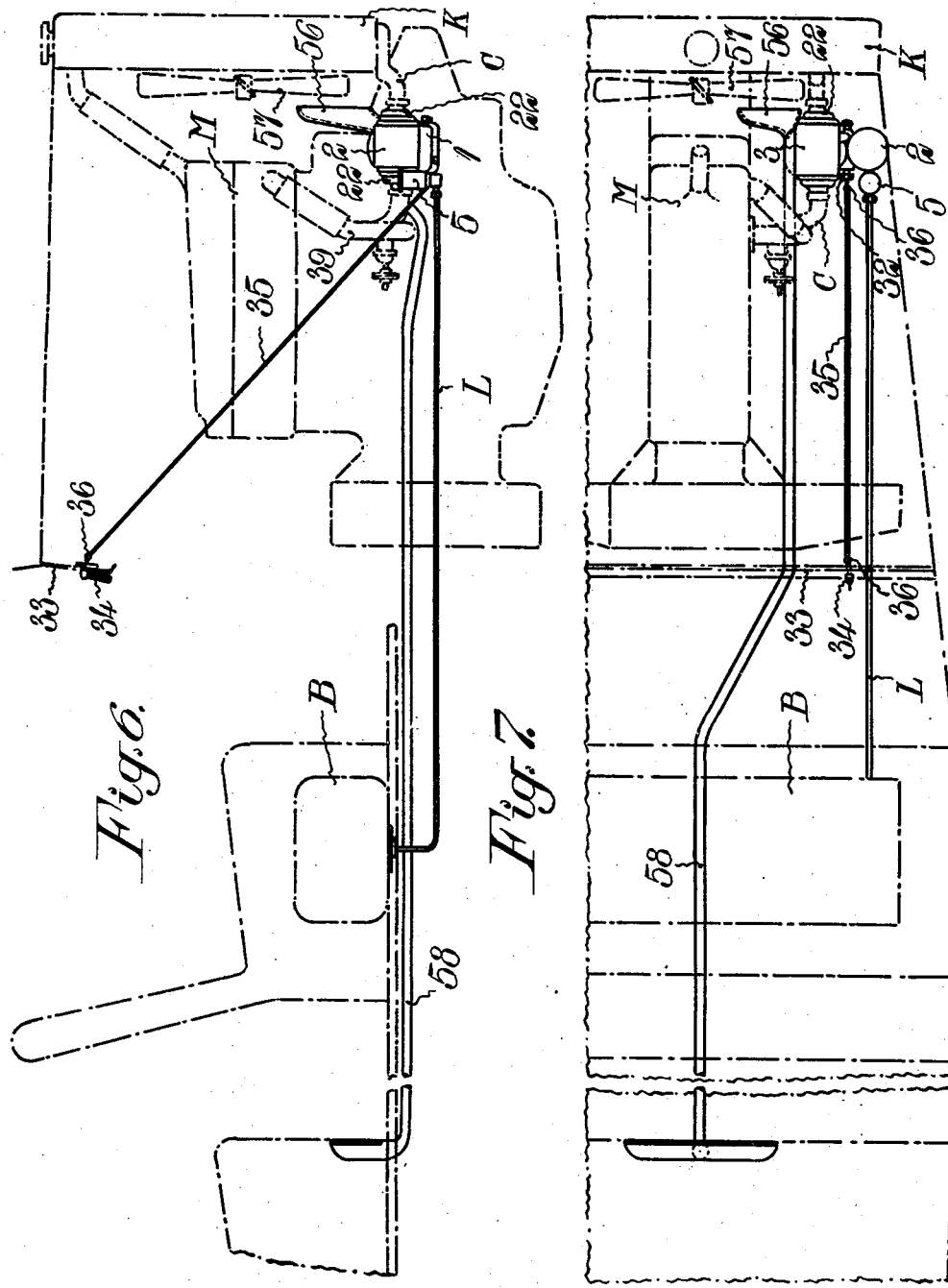

Patented Feb. 10, 1931

1,792,337

UNITED STATES PATENT OFFICE

OSCAR HERBERT WALLIN, OF LIMHAMN, SWEDEN

CATALYTIC HEATING DEVICE FOR INTERNAL-COMBUSTION ENGINES

Application filed December 4, 1928, Serial No. 323,735, and in Sweden November 9, 1928.

My present invention refers to improvements in catalytic heating devices, especially adapted, in case of requirement, for heating of the cooling medium in internal combustion engines when subjected to a low temperature.

The main object of the invention is to provide an apparatus of this kind adapted to be used as a fixed equipment on motor cars, motor boats, airplanes and the like for the purpose of preventing the cooling medium in the engine from freezing and for facilitating the start of the engine.

Another object of the invention is to provide a catalytic heating device which, although very small in size, has a very high heating capacity or useful effect, a minimum of attendance being required as the fuel to the apparatus is automatically supplied from a large storage tank separated from the heating apparatus itself, whereby said storage tank may consist of the main fuel supply at hand on the vehicle and adapted for feeding the engine, or engines, thereof.

Still another object of the invention is to provide a catalytic heating device provided with large evaporating surfaces for the fuel, in order to obtain an effective evaporation thereof before combustion, and with efficient means for transmitting the heat generated at the combustion to the cooling medium to be heated.

Other characteristics and objects of the invention will be apparent from the following description having reference to the accompanying drawings, wherein:—

Fig. 1 shows an elevation partly in vertical section of a heating apparatus according to the invention and adapted to be coupled into the circulation pipe for the cooling water in an internal combustion engine, for instance in motor cars or airplanes.

Fig. 2 shows the same apparatus seen from above partly in section, and Fig. 3 shows the same in an elevation taken at right angle to Fig. 1.

Figure 4:
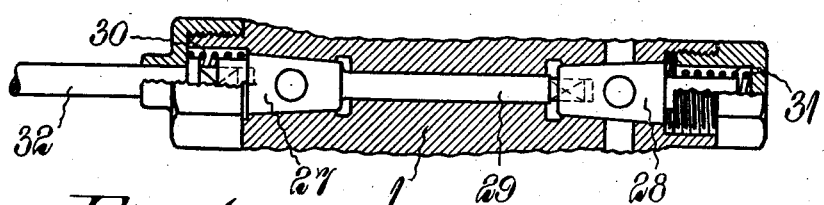
Fig. 4 shows a section of a detail, in connection with the apparatus according to Figs. 1-3.

Figs. 6 and 7 in elevation and plan view respectively show the apparatus mounted in a motor car and additionally adapted for heating the interior of the car body when driving.

The apparatus consists preferably of a cast metal base member 1 supporting the evaporating chamber 2 and the heating chamber 3 containing the catalyst, a float valve housing 4 being preferably also mounted directly on the aforesaid base member. The float 5 within said housing serves the purpose of adjusting a needle valve 6 for controlling a bottom inlet to the float housing, such inlet being coupled to a connection socket 7 beneath the float housing. The said socket is connected, for instance as shown in Figs. 6 and 7, by means of a suitable piping L with the gasolene tank B in the motor car, whereby it is provided that said tank is positioned at a higher level than the float housing, so that the gasolene on account of the gravity descends to the latter. By means of an opening 8 the float housing stands in communication with the evaporating chamber 2, and in the embodiment of invention referred to a cross-shaped support 9 made from wire netting or the like is provided within said chamber, said support being coated with an absorbent material 10. This material will thus form a very large evaporating surface for the gasolene which by means of the float valve arrangement a controlled quantity is admitted at the lower part of the evaporating chamber 2 and continually absorbed by the material 10, from which the fuel is brought to continually evaporate due to the large surface and due to the heat generated during the operation of the apparatus. The chamber 2 is provided with an upwardly open pipe 11 which at its lower end, by means of a channel 12 in the base member 1, stands in communication with a chamber 13 also located in said base member below the heating chamber 3. The lower end of the pipe 11 is provided with a sieve 14, and the opening at the upper end of said pipe is positioned at the side of the same or otherwise in a manner adapted for preventing gasolene drops from falling into the pipe.

The chamber 13 within the base member 1 is closed by a perforated plate 15, and the perforations therein are very narrow for preventing a flame from penetrating the plate. The plate 15 is covered by a net or grid 16 impregnated or covered by a catalytically active material, and by means of a spacing ring or the like such grid is supported at a little distance above the plate 15. Above the catalytic layer 16 there is provided a further grid or net 17 serving as a support for a relatively thick protective layer 18 of a fire-resistant and heat accumulating material, such as for instance infusorial earth (kieselguhr), asbestor or the like. Electric heating coils 19 may preferably be embedded in this last mentioned layer, such means in a known manner being intended for heating of the catalyst up to the temperature required for starting combustion, when the apparatus is to be set into action. In active service of the apparatus, the gas or gasolene vapour generated within the chamber 2 by means of the pipe 11 is transferred to the chamber 13, from whence it passes, by diffusion through the plate 15, it travels into contact with the catalyst 16. Thereby the combustion is effected at a high temperature due to the porous or spongy and heat accumulating layer 18, which limits the admittance of air to the catalyst to the amount just needed for the combustion and which accumulates the generated heat, until the temperature is raised in a substantial degree at which the heat with greatest efficiency can be transferred to the cooling water to be heated. For the purpose said water is passed through a number of pipes 20 extending through the chamber 3, said pipes at their ends being secured to the walls of the chamber provided with pipe heads or sockets 21 by means of which the apparatus may be mounted in the circulation pipe C for the cooling water between the motor M and the radiator K, for instance as shown in Figs. 6 and 7, so that the cooling water will be kept in circulation due to the heating.

Figure 5:
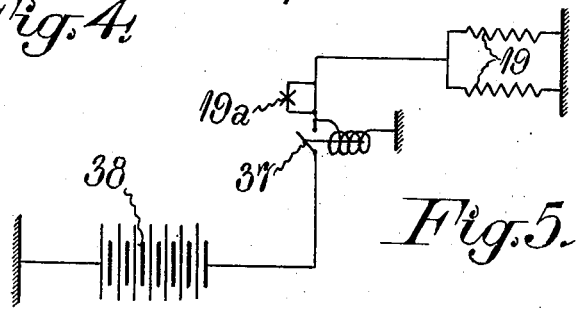
Fig. 5 shows a diagram of electric means for starting of the combustion.

For the purpose of admittance of the air required for the combustion, the chamber 3 in the proximity of its bottom is provided with one or more air intakes 22, and at its upper end the chamber is provided with corresponding outlets 23 which open into a jacket 24 surrounding the chamber and placed in a little distance around the same so that the chamber is heat insulated towards the atmosphere. For discharging the hot air from the jacket 24 in a measure required for ensuring the entrance of fresh air into the chamber 3 needed for the combustion in the manner described above, the jacket at the one side and at its lower portion is provided with a number of apertures 25, the inter-space between the chamber 3 and the jacket 24 at the opposite side of the latter and at the lower portion of the same being connected with an outlet pipe 26 extending below the evaporating chamber 2, said pipe being perforated and serving the purpose of heating the said chamber. This last mentioned heating is preferably controllable, especially in such a manner that the heating and thereby also the evaporation within the chamber 3 according to requirements does not exceed the amount needed in each instance for maintaining the combustion at the desired intensity, such intensity being controllable by controlling the supply of fuel to the combustion chamber either manually or automatically by means of thermostats or the like, for the purpose of maintaining a constant temperature of the cooling water or other medium to be heated. According to the embodiment of invention shown in Figs. 1–3 this control of the supply of fuel is effected by means of a valve means 27 in the channel 12, such valve means for the fuel being combined or coupled with another valve means 28 in connection with the air outlet pipe 26, so that the departure of hot air through this pipe and thereby the degree of heating of the evaporating chamber 2 is increased or decreased at an increase or decrease of the admittance of fuel to the combustion chamber. As shown in detail in Fig. 4 the valve means 27 and 28 are slideably interconnected by means of a rod 29 in such a manner that they may be pressed against their seats independent of each other by means of springs 30 and 31 respectively. According to Figs. 6 and 7 the spindle 32 of the valve 27 is connected with a handle 34 mounted on the instrument panel 33 in the motor car for instance by means of a shaft 35 connected with the spindle 32 and the handle 34 by universal joints 36. When the catalytic combustion is to be started, the valves 27 and 28 are opened by means of the handle 34, and simultaneously a time switch 37 (Fig. 5) mounted on the instrument panel is also closed, for instance by means of the same handle or otherwise, such switch forming part of an electric circuit through the heating coils 19 and the common storage battery 38 in the car, a control or signal lamp 19ᵃ being preferably also included in said circuit. After closing the time switch is kept closed during a certain period of time, for instance a few minutes, and thereunder the catalyst obtains the required temperature so that the combustion is started, whereafter the time switch 27 is automatically opened in a known manner so that the load arising on the storage battery 38 will then be relieved. Hereafter the combustion will be automatically continued without any attendance, until the admittance of fuel is again broken by means of the handle 34, or until the supply of fuel within the fuel tank has been consumed. The fuel consumption within the catalytic heating apparatus is very minute only, and therefore the amount of fuel usually at hand in the tank B (Figs. 6 and 7) in the car forms a practically unlimited source of fuel which is sufficient for months.

This fact is of the greatest practical value, as thereby it will be possible during an unlimited period of time without troubles and at a very minimal cost to prevent the freezing of the cooling water, and during the cold season a heating of the whole garage will be superfluous. Besides the car may be left for any time in the open during cold weather without any risk that the cooling water shall freeze and without the troubles otherwise arising when starting the engine on account of too low a temperature of the cooling water. These well-known problems, in spite of several attempts, have not previously been solved in a practically efficient or even useful manner, and herefrom the value of the invention will be appreciated. The invention is applicable not only on motor cars but also on airplanes and practically everywhere when it is desired during any periods of time, even long ones, without any trouble to provide for a moderate but continuous heating of the circulating medium within a circulation system.

As shown in Figs. 6 and 7 the combustion chamber 3 provided with transversing pipes for the cooling water may serve as a heat exchanger, when not driving, so as by means of the hot cooling water flowing through the pipes in said chamber to heat external air, which by means of suitable pipings is introduced into the interior of the car body for heating the same. For such purpose the chamber may be provided with an inlet hopper 56 positioned directly beyond the common fan 57, so that a part of the rearwardly directed stream of air may be taken up by said hopper and introduced into the chamber 3 around the hot flow pipes for the cooling water, whereby the air is heated and by a pipe 58 it is transmitted to the interior of the car body for heating the latter. Quite the same arrangement may, of course, also be used in airplanes, and for such purpose the invention will also involve great advantages.

As already stated above and shown in the different embodiments, the construction of the catalytic heating device may be varied in many ways without departing from the principle of invention. It is obvious that the evaporating chamber may also be constructed in a number of different ways, especially so far as regards obtaining the large evaporating surface required. The evaporating surface, while preferably consisting of absorbent material may also comprise spraying devices or the like, or of non-absorbent material upon which the gasoline may be distributed in a thin layer by any suitable means.

What I claim and desire to secure by Letters Patent is:—

1. In a catalytic heating device for a liquid fuel, an evaporator for the fuel, a storage tank for the same, communication means for transmitting the fuel from the storage tank to the evaporator, an evaporating chamber within said evaporator, evaporating means within said chamber provided with large evaporating surfaces, a combustion chamber, communication means between the evaporating and combustion chambers for transferring the evaporated fuel to the latter, pipe means for transmitting the medium to be heated in a heat-transmitting relation to the combustion chamber without directly contacting with the combustion gases therein, a catalyst positioned in the combustion chamber, insulating means between the catalyst and the chamber walls contacting with the medium to be heated and serving the purpose of preventing an altogether too free admittance of air to the catalyst.

2. In a catalytic heating device as described, a common base member, an evaporator and a combustion chamber mounted side by side on said base member, a storage tank for the fuel, means for transmitting the fuel from said storage tank to the evaporator, a chamber provided within the base member in a position adjacent to the combustion chamber, a perforated division wall between said two chambers, intercommunication means between the chamber in the base member and the evaporator, a foraminated member prepared with a catalytic active material positioned adjacent to said perforated division wall, a porous and heat-accumulating material covering the foraminated catalytic member, and means for transmitting the medium to be heated in a heat-transmitting relation to the combustion chamber without directly contacting with the combustion gases therein.

3. A catalytic heating device according to claim 1, characterized in that a number of pipes for transmitting the medium to be heated are affixed to the end walls of the combustion chamber and penetrate the same, such pipes at their ends being connected with heads or sockets common to all of the pipes at each end and serving the purpose of connecting the apparatus with a circulating system for the medium to be cooled.

4. A catalytic heating device according to claim 2, characterized in that a perforated outlet piping for air heated within the combustion chamber is mounted in a heat transmitting relation to the evaporating chamber for the purpose of heating the latter.

5. A catalytic heating device according to claim 2, characterized in that a controllable valve member is mounted in the transmission piping from the evaporating chamber to the combustion chamber.

6. A catalytic heating device according to claim 2, characterized in that the evaporating chamber is connected with the common fuel tank in an engine-driven vehicle by means of a piping including a float controlled valve controlling the fuel admittance to the evaporating chamber.

7. A catalytic heating device according to claim 1, characterized in that a suitable support, of a foraminous character, is mounted within the evaporating chamber and covered with an absorbent material for absorbing the fuel entering the said chamber and providing large surfaces for facilitating the evaporation of the fuel.

8. In a catalytic heating device as described, an evaporator for the fuel, a storage tank for the same, communication means for transmitting the fuel from the storage tank to the evaporator, evaporating means within the evaporator, a combustion chamber, communication means between the evaporator and the combustion chamber and adapted for transferring the evaporated fuel to the latter, channel means for leading off the heated air from the combustion chamber, controllable valve means mounted in the communication means between the evaporator and the combustion chamber, valve means mounted in the channel means for leading off the air from the combustion chamber, mechanical connection means between said first-mentioned valve means and the second mentioned one, and pipe means for transmitting the medium to be heated in a heat-transmitting relation to the combustion chamber without directly contacting with the combustion gases therein.

9. A catalytic heating device according to claim 1 comprising a plurality of pipes for transmitting the medium to be heated, the said pipes being fixed to the end walls of the combustion chamber and penetrating the same, heads or sockets common to all of the pipes at each end thereof and connecting the apparatus with a circulating system for the medium to be cooled, the combustion and evaporating chambers being mounted side by side on a common base member, the said base member having a chamber below the combustion chamber, a perforated plate covering the said chamber in the base member, and means defining a channel leading from the evaporating chamber with which the said chamber in the base member is connected.

In testimony whereof I have signed my name to this specification.

OSCAR HERBERT WALLIN.